United States Patent [19]

Sackett

[11] Patent Number: 4,616,285

[45] Date of Patent: Oct. 7, 1986

[54] SAFETY AND SELECTIVE USE SWITCH FOR A POWER OUTLET

[76] Inventor: Robert L. Sackett, 2282 #43 Caminito Pescado, San Diego, Calif. 92107

[21] Appl. No.: 610,277

[22] Filed: May 14, 1984

[51] Int. Cl.[4] .................................... H02H 7/00

[52] U.S. Cl. .................................... 361/1; 174/53; 174/67; 200/61.93; 335/205; 339/12 R; 339/12 G; 339/111

[58] Field of Search .................... 335/205, 128; 361/1; 307/10 R, 10 AT, 112, 114, 116; 200/44, 61.7, 61.93; 174/53, 67; 339/12 R, 12 G, 111

[56] References Cited

U.S. PATENT DOCUMENTS

| | | | |
|---|---|---|---|
| 2,877,361 | 3/1959 | Chase | 307/112 |
| 3,246,179 | 4/1966 | Berner | 307/112 |
| 3,559,124 | 1/1971 | Posey | 335/205 |
| 3,696,380 | 10/1972 | Murphy | 200/61.93 |
| 3,760,312 | 9/1973 | Shlesinger, Jr. | 335/205 |
| 4,210,888 | 7/1980 | Holce | 335/205 |

*Primary Examiner*—A. D. Pellinen
*Assistant Examiner*—Jeffrey A. Gaffin
*Attorney, Agent, or Firm*—Frank D. Gilliam

[57] ABSTRACT

A magnetically operated switch wired in series between a source of electrical current and an electrical appliance. In one embodiment the switch is used in conjunction with a convenience wall outlet and is activated to supply power to the outlet by means of a cylindrical magnet carried by the mechanical ground pin of a conventional wall plug. Another embodiment utilizes a cylindrical magnetic in the form of a key for insertion into a receptacle for operating the magnetic switch. Another embodiment employs a magnetic switch and a magnetic type key for operating a relay having a switch capable of carrying large current loads.

14 Claims, 9 Drawing Figures

SAFETY AND SELECTIVE USE SWITCH FOR A POWER OUTLET

BACKGROUND OF THE INVENTION

1. Field of the Invention

The invention generally relates to a means for controlling the voltage at a power outlet and more particularly to a magnetic switching means for selectively providing voltage at a power outlet.

2. Description of the Prior Art

Local sources of voltage, such as convenience wall outlets well known for use with a mating plug attached to a voltage operated appliance as well as central switches for selectively providing and terminating power to convenience outlets and appliances directly wired to a source of power are well known.

It is also well known that key operated switches, covers for convenience outlets, convenience outlet inserts and the like, are readily available for use to prevent the unauthorized use of such convenience outlets or directly wired appliances, particularly by inexperienced small children.

It is obviously desirable to provide a convenient means whereby small children cannot directly come in contact with a source of voltage, such as, in an open convenience outlet by the insertion of small fingers or metallic objects held in the hand or be able to turn on an appliance that is either dangerous to the child or could cause other forms of damage.

Obviously, when considering the safety of small children, a convenient means of removing and turning on the power from open convenience outlets and preventing the accidental operating of appliances is of foremost importance. Until the emergence of the instant invention such a convenient and partial means for selective energizing and removing such power was not available.

SUMMARY OF THE INVENTION

It is an object of this invention to provide a means to selectively energize and remove the voltage from a normally open convenience outlet or from a voltage source to a directly wired appliance.

It is another object of this invention to provide a means for energizing a normally de-energized convenience outlet by insertion of the mating plug.

It is a further object of this invention to provide a convenient magnetic means to energize or de-energize one or more convenience outlets or directly wired appliances simultaneously.

The principal of the invention is directed to the use of a magnetically operated switch having a normally open state whereby a magnet positioned adjacent thereto causes the switch to change to a closed state. Several embodiments are disclosed. In one embodiment the third or neutral prong of a conventional three prong convenience outlet engaging plug either contains a central magnet or is a magnet and the normally open magnetic switch is located within the convenience outlet adjacent the third or neutral pin when the plug normally engages the outlet. The magnet closes the normally open magnet switch rendering he normally voltage free outlet to a voltage available outlet.

Another embodiment of the invention uses a magnet in the form of an insertable pin with an enlarged end to operate a magnetic switch to its closed position to supply voltage to a circuit further controlled by a simple series wired switch. In this embodiment the normally open magnetic switch is wired in series between the source of voltage and the simple switch.

In another embodiment of the invention, the insertable magnet and associated normally open switch is used to selectively provide or disconnect a source of voltage from a plurality of convenience outlets in any multiple.

A further embodiment of the invention the magnetic switch/magnet combination is utilized to operate a relay switch whereby the relay switch is capable of handling greater currents than the magnetic switch in a closed state.

A still further embodiment of the invention the magnetic switch/magnet combination operates as an in-line switch for a directly wired appliance or scatter-box type convenience outlet.

Further objects and advantages of the instant invention will become apparent as the following description proceeds and the features of the novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DETAILED DESCRIPTION OF THE FIRST PREFERRED EMBODIMENT

The same numerals are used throughout the specifications and drawing Figures to designate the same or similar element or part.

Figure 1:
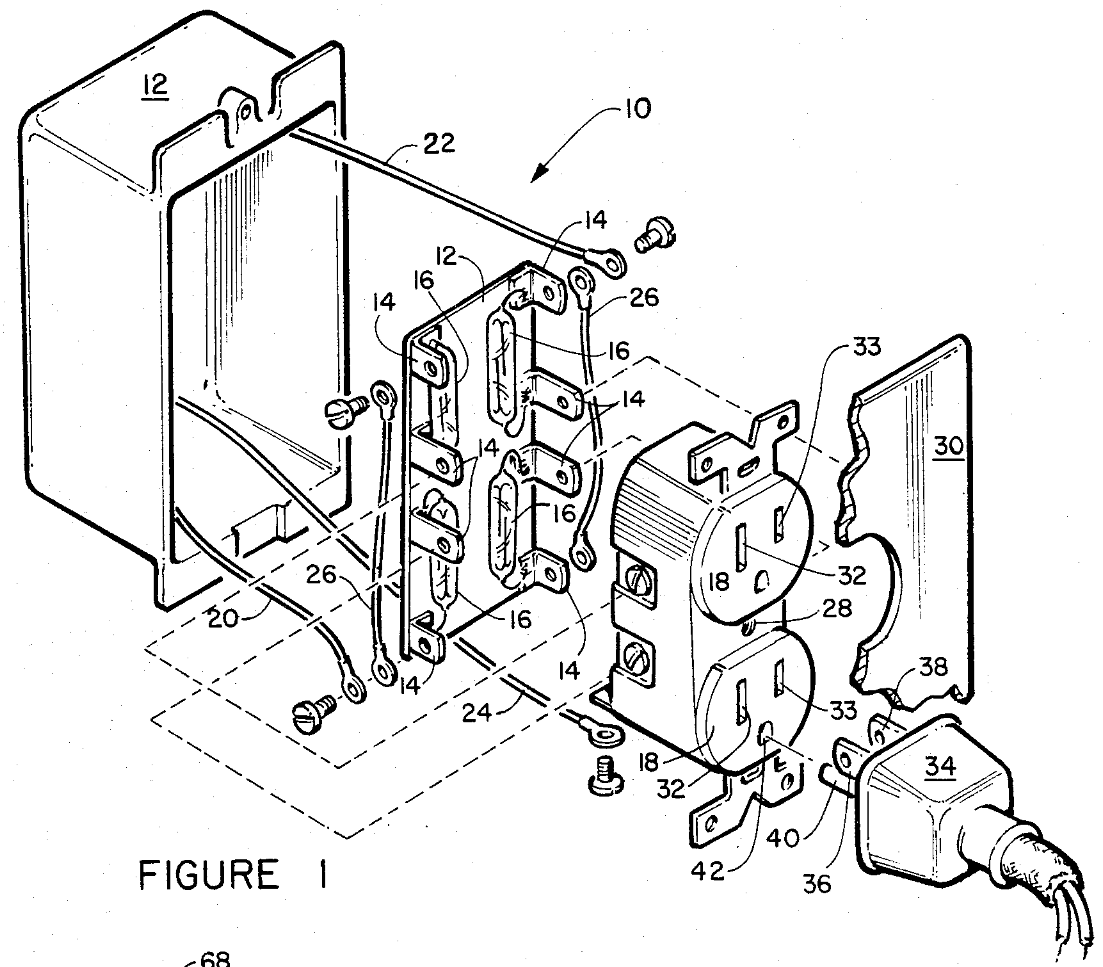
FIG. 1 depicts an exploded view in perspective, partially cutaway, depicting a conventional convenience wall outlet assembly and mating plug employing the invention.
Figure 2:
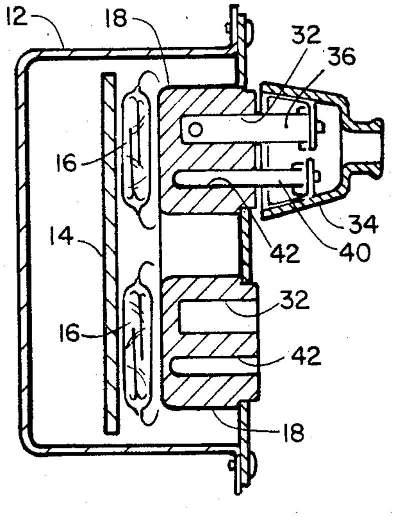
FIG. 2 is a cutaway side view of FIG. 1 with the convenience wall outlet assembly in an assembled mode.

Referring now specifically to FIGS. 1 and 2, an exploded partially cut-away showing of the invention employed in a multiple convenience wall outlet assembly 10 is shown. The assembly comprises a housing 12 which is secured to building studs or joists or the like. A plate or base member 14 is configured to adapt within the housing 12 when properly positioned. The plate or base member is constructed of non-electrical conductive material, such as a plastic, fiber board or the like and has a plurality of electrically conductive attachment posts 14 attached thereto. Connected between pairs of adjacent spaced apart posts is a magnetically operated switch 16. In FIG. 1 a pair of horizontally positioned magnetically operated switches 16 are shown for operation with each of the conventional three prong receptacles 18. It should be understood that the use of a single magnetically operated switch 16 in series with the positive or hot wire also operate to control the positive voltage to the one prong of the receptacle.

Also the circuit of FIG. 1 could include a second adjacent bank of vertical receptacles which a portion of the magnetically operated switches control. The various wires 20, 22, and 24 terminating within the housing respectively provide positive, negative and neutral connections from the power source to the convenience outlet while the jumper wires 26 connect the output of one or more receptacles to the magnetic switch or switches output the input of which is connected to either the positive or negative wire from the power source. Conventional electrical lugs and screws are used for attachment of the various wires and jumpers to the terminals of the base member 12 or receptacle assembly 28. The front plate 30 is connected to the receptacle assembly 28 in a conventional manner.

When the assembly of FIG. 1 is assembled and installed into the structure mounted housing as shown in FIG. 2, the insertion of objects into the openings 32, 33 of the receptacle, including a standard three prong plug shaped such as 34 will receive no voltage from the receptacle. The receptacle, as is, is now free from voltage at the terminals within the opening 32, 33.

In order to activate the receptacles, a special three prong plug 34 is necessary. The special plug 34 takes the same configuration as the standard receptacle mating plug. The plug has the normal three prongs 36, 38 and 40. Prongs 36 and 38 represent positive and negative potentials. The ground prong 40 which is designed to be received into socket 42 when the plug 34 is in place is either constructed of a cylindrical magnet or is a conventional non-ferrous prong with a central magnet positioned therein.

Referring now specifically to FIG. 2, with plug 34 mated to receptacle 18 the magnetic flux of the magnet of prong 40 closes the normally open magnetic switches 16 adjacent thereto closing the normally open circuit to prongs 36 and 38 thereby providing power to the prongs in a conventional manner. As hereinbefore discussed, either the positive or both the positive and negative potentials includes a series like magnetic switch 16.

Figure 3:
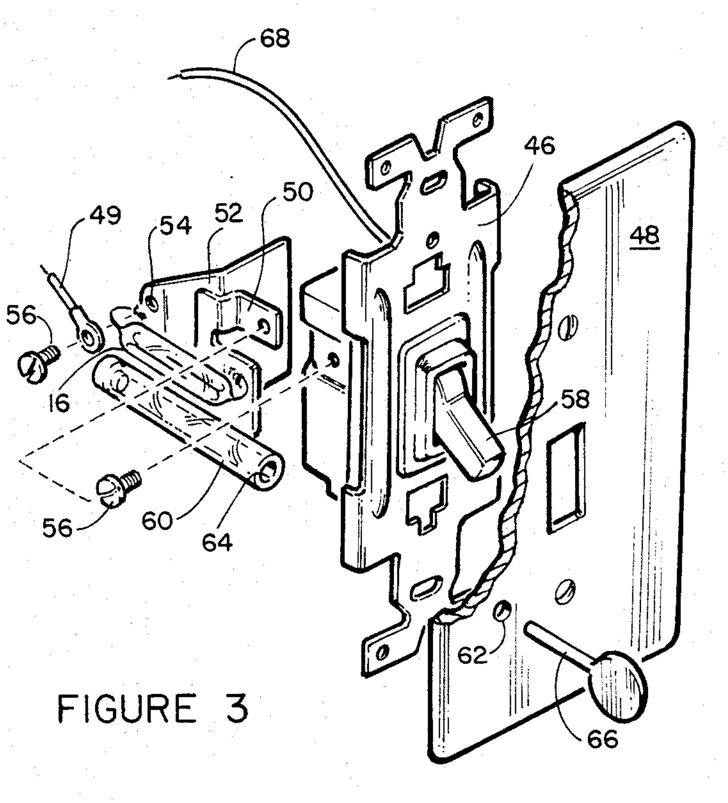
FIG. 3 is a perspective, partially cut-away exploded view of a conventional wall mount switch for an appliance and/or machinery employing the invention.
Figure 4:
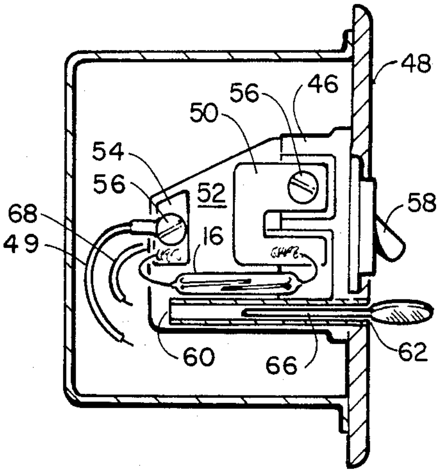
FIG. 4 is a partial cut-away side view of FIG. 3.

Referring now specifically to FIGS. 3 and 4, a conventional on/off type wall mount switch is shown. The components of the switch are shown exploded for detail in FIG. 3 and a side cutaway view is shown in FIG. 4. Like the receptacles of FIGS. 1 and 2 a conventional wall mount housing 12 is used to attach the switch element 46 to a fixed surface. A face plate 48 is then secured over the switch element 46. Electrically, the switch normally is placed in series with the wire having positive potential from the power source; however, other switches have switching contacts for opening and closing both the positive and negative potentials may be employed. The housing, switch element and face plate are conventional and well known in the art. Attached to the switch element 46 at the normal contact point for the connection of the wire 49 from the power source having potential to be opened or closed is a terminal 50. Terminal 50 is electrically isolated from and physically attached to bracket 52. Likewise connected to bracket 52 is a terminal 54. Connected between terminal 50 and terminal 54 is a normally open magnetically activated switch 16 as hereinbefore discussed. Terminal 50 is connected to one terminal of the switch and the wire 49 is connected to the other terminal of the switch at terminal 54 by means of a screw 56 or the like. Connected in this manner the magnetically operated switch 16 is wired in series between the power source potential to be opened and closed and the switch element 46. The switch is operated in a conventional manner by means of switch lever 58. Connected adjacent to the magnetically operated switch 16 is a non-ferrous guide tube 60. This guide tube 60 is preferably constructed of plastic, glass or the like. An opening or aperture 62 is provided through face plate 48. The opening or aperture 62 aligns with the central bore 64 through guide tube 60. A magnet 66 in the form of a key conforms to the opening 62 and bore 64 and when inserted therein influences the reeds in magnetically operated switch 16 changing its normally open state to a closed state allowing the switch element to operate in a normal manner. The absence of the key magnet 66 prevents the switch element from operating in a normal manner. A line 68 attached to the opposite side of the switch provides positive voltage to the appliance controlled by the switch when the magnetically operated switch 16 and switch element 46 are in a closed state.

Figure 5:
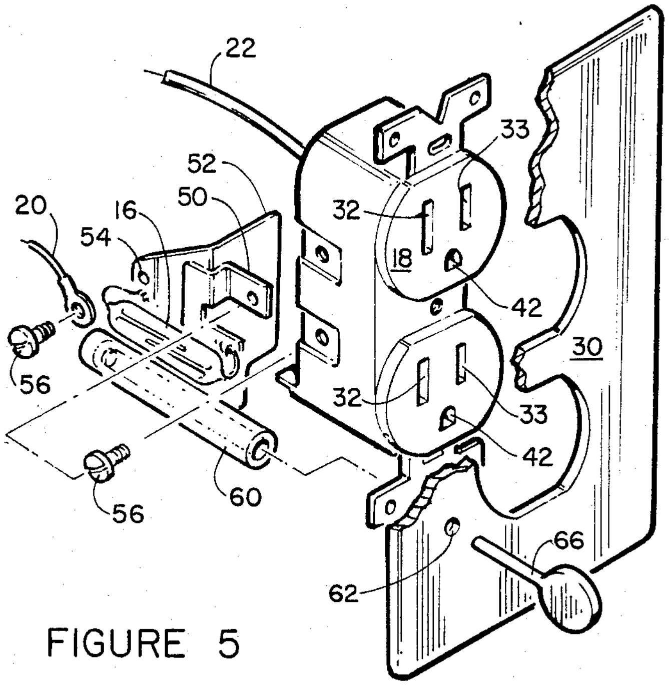
FIG. 5 depicts a perspective, partial cutaway, showing of a convenience wall outlet employing a further embodiment of the invention.

Referring now to FIG. 5, there is shown a partial cutaway, exploded view, in perspective of a wall type convenience outlet employing a series magnetically operated switch. The operation of the circuit is the same as the operation of the circuit of FIGS. 1 and 2. The magnetically operated switch circuit is connected in series between the positive potential wire 20 and sockets 32 of the receptacle 18. Wire 22 is either connected directly to a common terminus connected to both sockets 33 or a second magnetically operated switch circuit is connected to the positive wire 20 as in FIGS. 1 and 2. The key 66 when inserted allows the positive potential to be available on both the upper and lower receptacle. It should be understood that the key 66 allows any conventional three prong plug to be used and does not require the special plug 34 as hereinbefore described. A second key 66 (not shown) would be used in a like manner if the negative potential side of the convenience outlet also utilizes a magnetic switch.

Figure 6:
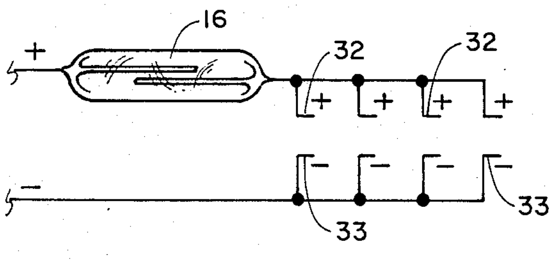
FIG. 6 is a schematic showing of the wiring of the FIG. 5 showing.

As shown in FIG. 6, any convenient number of receptacles can be controlled by a single magnetically operated switch. The obvious limitation is the current carrying capabilities of the elements of the magnetic switch 16.

Figure 7:
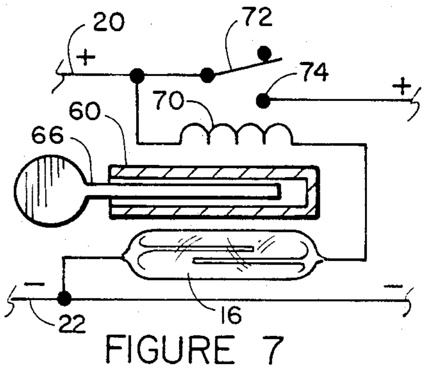
FIG. 7 is a schematic showing of the use of the magnetic switch and magnet combination of the invention for operating a relay switch.

Referring now to FIG. 7, an electrical circuit is shown which allows a magnetically operated switch 16 to be used where large current demands are required. Connected in series between the positive and negative potentials 20 and 22 is a magnetically operated switch 16 and the coil 70 of a relay switch 72. When key 66 is inserted into the central bore of the guide tube 60 magnetically operated switch 16 changes from its open to a closed state allowing current to flow through coil 70 closing switch 72 placing positive potential at the switch terminal 74. It should be understood that the conductivity of silicon controlled rectifiers (SCR), Triacs and the like can be controlled equally as well by use of magnetic switch of FIG. 7.

Figure 8:
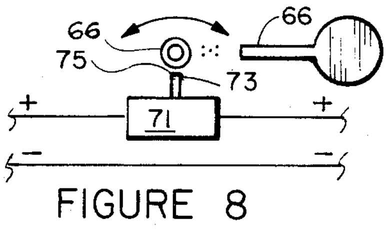
FIG. 8 is a schematic showing of the use of a magnetic force to operate a conventional micro switch.

FIG. 8 is a schematic showing of use of a key 66 and guide tube 60 for the operation of a micro-switch 71. The operating lever 73 of the micro switch 71 includes a permanent magnet 75 with the same pole as the end of key 66 whereby the added repulsive forces of the magnets force the operating lever 73 to pivot thereby changing the slate of the micro-switch 71. Obviously unlike poles could also be used to provide operation lever operators of a micro-switch under certain conditions.

Figure 9:
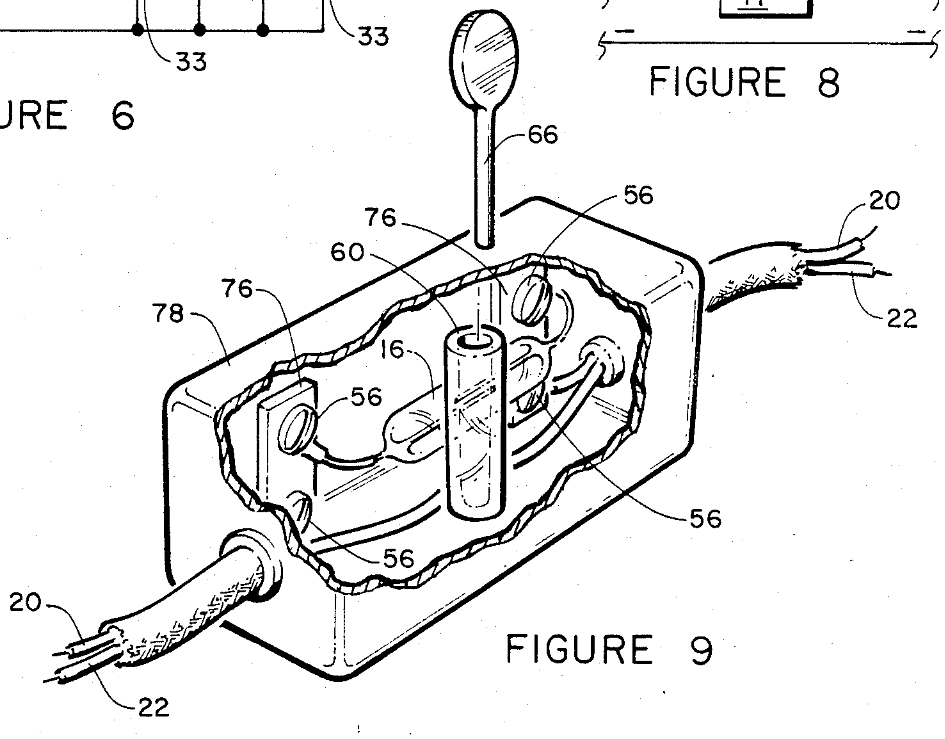
FIG. 9 is a perspective partially cutaway employing the invention in a power line.

FIG. 9 is a partial cutaway perspective showing of a magnetically operated switch employed in a flexible power cord conventionally used to selectively connect appliances to a power source. A pair of non-conductive terminal blocks 76 fixedly secured within housing 78 support the terminals of the magnetically operated switch 16. In this configuration the switch is wired in series with positive potential wire 20. With the insertion of key 66 into the central bore of alignment guide 60 the switch 16 is closed allowing current to flow in line 20.

It should be understood that there may be applications where the magnetically operated switch will be in a normally closed state and switched to an open state by means of a magnet key.

Many changes may be made in details and materials of fabrication, in the configuration and assemblage of the constituent elements, without departing from the spirit and scope of the appended claims, which changes are intended to be embraced therewithin.

Having thus described the invention, what is claimed as new and useful and desired to be secured by United States Letters Patent is:

1. A safety switch comprising: an electrical power circuit, said power circuit having at least one electrical connection extending between a power source and said safety switch remotely positioned from said power source;

- a first magnetically activated switch means connected in series between said source and termination means;
- a magnet; and
- a magnet positioning means located adjacent to said first magnetically activated switch means for receiving said magnet therein whereby the magnetic influence of said magnet changes the state of said first magnetically operated switch means and opens said electrical power circuit.

2. The invention as defined in claim 1 wherein said electrical power circuit comprises two separate electrical connections extending between said source and said termination means said safety switch further comprises a second magnetically activated switch means, said first and second magnetically activated switch means connected in series between said source and termination means, said magnet positioning means is located adjacent to both said first and second magnetically activated switching means whereby the magnetic influence said magnet when positioned within said magnet positioning means changes the state of both said first and second magnetically activated switch means.

3. The invention as defined in claim 1 wherein said termination means is a convenience wall outlet including terminations for two separate electrical connections and a safety mechanical ground connection, said safety switch further comprises, a plug matable with said convenience wall outlet, wherein said safety ground connection of said outlet is said magnet positioning means and the mating safety mechanical ground connection of said plug comprises said magnet whereby when said plug is mated with said convenience wall outlet the state of said magnetically activated switch means is changed.

4. The invention as defined in claim 1, further including an electrical appliance wherein said termination means is a power switch means in series with said source and an electrical appliance.

5. The invention as defined in claim 1 wherein said first magnetically activated means controls the voltage output of a plurality of parallel wired remote termination means.

6. The invention as defined in claim 1 wherein said remote termination means comprises a plurality of convenience wall outlets and plugs.

7. The invention as defined in claim 1 wherein said magnetic positioning means is constructed of non-ferrous material.

8. The invention as defined in claim 1 wherein said first magnetically operated switch means is a micro-switch having a pivotal operating lever, the distal end of said pivotal operating lever includes a permanent magnet whereby the combined magnetic forces of said magnet and permanent magnet when adjacent change the state of said micro-switch.

9. The invention as defined in claim 7 wherein said non-ferrous material is plastic.

10. The invention as defined in claim 1, further including an appliance wherein said power source is a convenience wall outlet and said terminating means is said appliance and said safety switch is connected in series therebetween.

11. The invention as defined in claim 1 wherein said first magnetically activated switch means is in a normal open state.

12. The invention as defined in claim 2 wherein said first and second magnetically activated switch means are in a normal open state.

13. A safety switch comprising an electrical power circuit having at least two electrical connections between a source and a remote location, said safety switch comprising:

- a normally open first magnetically operated switch means having an input and output;
- a magnet;
- a magnet positioning means located adjacent said first magnetically operated switch means; and
- a relay means having an activating coil with input and output connection and a normally open switch having input and output connections associated therewith, said first magnetically activated switch means is series connected between one of said at least two electrical connections and one of said coil connections, said normally open switch being in series with the other of said at least two electrical connections whereby when said magnet is inserted into said magnetic positioning means said first magnetically activated switch means is closed, current flows through said related coil causing said switch associated with said coil to close.

14. A safety switch comprising an electrical power circuit having two electrical connections between a source and a remote location said safety switch comprising:

- a normally open first magnetically operated switch means having an input and output;
- a magnet;
- a magnet positioning means for receiving said magnet located adjacent said first magnetically operated switch means; and
- a control means having an input, output and control connection, said input and output connections connected in series with one of said two electrical connections, said first magnetically activated switch means in series connected between one of said two electrical connections and said control connection whereby when said magnet is inserted into said magnetic positioning means said first magnetically activated switch means is closed and voltage is applied to said control connection causing current to flow through said control means.

* * * * *